Nov. 17, 1925.
M. MORRISON ET AL
LOCKING NUT
Filed March 29, 1924
1,561,880
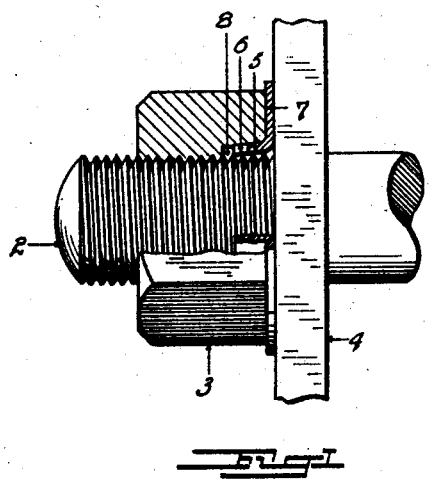
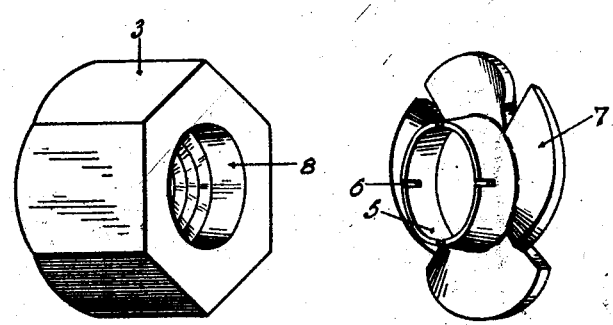
Inventors:
Mark Morrison
Thomson Denholm Vass
and Arthur Churchill Fisher
By
Attorney.

Patented Nov. 17, 1925.

1,561,880

UNITED STATES PATENT OFFICE.

MARK MORRISON, OF LONDON, ENGLAND, AND THOMSON DENHOLM VASS AND ARTHUR CHURCHILL FISHER, OF VEREENIGING, TRANSVAAL, SOUTH AFRICA.

LOCKING NUT.

Application filed March 29, 1924. Serial No. 702,852.

*To all whom it may concern:*

Be it known that MARK MORRISON, British subject, of c/o Mr. Mountstephen, 63 Queen Victoria Street, London E. C., England, and THOMSON DENHOLM VASS and ARTHUR CHURCHILL FISHER, British subjects, and residing at Vereeniging Estates, Vereeniging, Transvaal, Union of South Africa, have invented certain new and useful Improvements in Locking Nuts, of which the following is a specification.

The present invention relates to means for non-rotatively locking together complementary threaded elements, herein referred to as a bolt and a nut.

The invention is illustrated in the accompanying drawings in which—

Fig. I shows the parts assembled,

Fig. II is a projected view of the nut,

Fig. III is an oppositely projected view of the locking device.

In the drawings 2 indicates any ordinary form of bolt, 3 is a nut, and 4 is an element, such as a plate, through which the bolt passes and into which the nut screws down.

The locking device comprises a ring-shaped element 5 which lies around the bolt. Said element is adapted to be radially compressed onto the bolt; for which purpose it may be divided by longitudinal slits 6 into a number of radial segments.

Said element 5 is adapted to be held by the plate 4 against longitudinal movement on the bolt and may accordingly be formed as a central pressed-out flange of a washer 7 which is interposed between the nut 3 and the plate 4.

The nut 3 is so formed that when it is screwed up, it compresses the element 5 onto the bolt and itself rockingly engages said element. Conveniently for this purpose the nut is formed with a conical counter-bore 8 at its base. The element 5 may be made similarly of initially somewhat conical form to facilitate its engagement by the nut.

The result is that upon placing the locking device in position on the bolt and screwing up the nut, the conical bore 8 of the same engages wedge-wise with the external surface of the element 5 and also compresses said element 5 into jambing engagement with the surface of the bolt. Simultaneously there is a strong frictional engagement set up between the threads of the nut and the bolt due to the element 5 opposing the screwing-down movement of the nut. The bolt, the locking device, and the nut are thus all frictionally secured to one another.

The locking action may be enhanced by suitably forming the washer portion 7 of the locking device. It is shown for this purpose as a spring washer of a generally flat conical form and cut or slit radially to form segments which are individually bent to helical shape. When the nut is screwed down, the washer is more or less flattened and acts to bind the nut and bolt to the plate 4. It is to be observed that the radial slits just referred to are disposed out of alinement with the longitudinal slits 6 in the flange portion 5 of the device, so that the latter as a whole forms an unbroken annulus; due to which fact, weakening of the device is avoided.

We claim:

A device for locking together complemental internally and externally threaded members, comprising a spring washer which is formed with radial slits to divide it into helical segments, and a central flange projecting from the washer and adapted to encircle the externally threaded member, said flange being formed with longitudinal slits to divide it into resilient segments adapted to be compressed radially directly into engagement with that member by the internally threaded member, the longitudinal slits being disposed out of alinement with the radial slits so that the device as a whole forms an unbroken annulus.

In testimony whereof we have hereunto set our hands.

MARK MORRISON.
THOMSON DENHOLM VASS.
ARTHUR CHURCHILL FISHER.